3,268,500
PROCESS FOR PREPARING TRANS-1,4-POLYDIOLEFINS
Grover C. Royston, Baton Rouge, La., assignor to Copolymer Rubber & Chemical Corporation, a corporation of Louisiana
No Drawing. Filed Jan. 29, 1962, Ser. No. 169,642
12 Claims. (Cl. 260—94.3)

This invention relates to polymers having a high trans-1,4-configuration prepared from homopolymerizable conjugated diolefins, and to a composition and process for preparing the same utilizing a novel catalyst. The invention further relates to a novel catalyst, and to a composition and process for preparing the catalyst.

In some instances, for purposes of convenience, the invention may be illustrated and described with specific reference to butadiene. However, it is understood that when desirable it may be possible to use other conjugated diolefins to produce homopolymers characterized by a high trans-1,4-configuration. The nature of the conjugated diolefins which may be used in practicing the invention will be more fully explained hereinafter.

Butadiene has been homopolymerized heretofore by a solution polymerization process to produce trans-1,4-polybutadiene, but only with heterogeneous catalysts. The heterogeneous stereospecific polymerization catalysts of the prior art exhibited a relatively low activity and high ratios of catalyst to butadiene were necessary in order to effect polymerization in a practical period of time. Also, separation of the catalyst from the polymer product is difficult and usually requires an acid wash. The art has long recognized the need for a soluble catalyst of high activity having the ability to effect the stereospecific polymerization of butadiene to high trans-1,4-polybutadiene, but such a catalyst has not been available heretofore.

It is an object of the present invention to provide a novel catalyst which is especially useful in the polymerization process of the invention, and a process for preparation of the catalyst.

It is a further object of the present invention to provide a novel process for preparing polymers having a high trans-1,4-configuration from homopolymerizable conjugated diolefins in the presence of the catalyst of the invention.

It is a further object to provide novel compositions of matter which are especially useful in preparing the catalyst and/or polymers in accordance with the processes of the invention.

Still other objects of the invention and the attendant advantages will be apparent to those skilled in the art upon reference to the following detailed description and the examples.

In accordance with one important aspect of the invention, a process is provided for preparing polymers having a high trans-1,4-configuration from homopolymerizable conjugated diolefins in which the polymerization is effected in solution in an organic solvent and in the presence of a catalytic amount of the novel soluble catalyst of the invention to be described more fully hereinafter. The process of the invention is especially useful in preparing high trans-1,4-polybutadiene.

The novel catalyst of the invention may be prepared by bringing together in solution in an organic solvent a soluble vanadium compound and an organoaluminum dihalide. The soluble vanadium compound may be, for example, an organic complex of vanadium such as the beta-diketone complexes of vanadium. Specific examples include vanadium triacetylacetonate and vanadyl acetylacetonate. It is also possible to use the corresponding soluble iron and titanium compounds in some instances. However, vanadium is by far the most active catalyst metal and the above-mentioned vanadium compounds fall into a class of their own for use in the invention. In view of this, vanadium or vanadium compounds may be referred to hereinafter for purposes of simplifying the discussion.

The organoaluminum dihalides may be preformed and then used in preparing the catalyst or they may be formed in situ. For example, the organoaluminum dihalide may be formed in situ from a mixture of aluminum halide and one or more components such as triorganoaluminum, aluminum hydride, diorganoaluminum halide or hydride, or dihaloaluminum hydride, in the proper ratios to provide the organoaluminum dihalide. The organic substituent of the organoaluminum dihalide may be, for example, a saturated alkyl, aryl, cycloalkyl, or aralkyl radical containing between 1 and 20, but preferably 1–4 carbon atoms. Usually, alkyl aluminum dihalides are preferred, and especially ethyl aluminum dihalide. Especially good results are obtained when the dihalide is a dichloride or dibromide, and dichlorides are usually preferred.

Combinations of specific vanadium compounds and aluminum compounds which have been found to give unusually good results include ethyl aluminum dichloride and vanadium triacetylacetonate or vanadyl acetylacetonate. However, it is understood that numerous other satisfactory combinations of vanadium and aluminum compounds may be used.

When preparing the catalyst, the ratio of the organoaluminum dihalide to the vanadium compound is critical. For example, the organoaluminum dihalide and the vanadium compound must be present in quantities to provide a gram atomic weight ratio of aluminum to vanadium of at least 6:1, as at lower ratios an insoluble material is obtained which is ineffective as a catalyst. There does not appear to be a definite upper limit on the aluminum/vanadium ratio, but for economic reasons it is usually preferred that the ratio be not greater than about 50:1 and preferably not greater than about 35:1. The preferred ratio is usually between about 6:1 and about 15:1 in most instances. The Al/V ratio is based upon the quantities of the organoaluminum dihalide and the vanadium compound used in preparing the catalyst, i.e., upon the number of gram atomic weights of aluminum present in the quantity of the organoaluminum dihalide and the number of gram atomic weights of vanadium present in the quantity of the vanadium-containing compound.

The catalyst may be prepared in the polymerization solution, or it may be prepared prior thereto and then added. In instances where the catalyst is prepared in the polymerization solution, this may be accomplished by adding the organoaluminum dihalide, preferably as a solution in an aromatic solvent such as benzene, and thereafter the vanadium compound is added, also preferably as a solution in an aromatic solvent such as benzene. Thereafter, the butadiene to be polymerized may be added. While this is the preferred procedure for preparing the catalyst in situ, other orders of addition are possible and may be used.

In instances where the catalyst is prepared outside of the polymerization solution, preferably a solution of the vanadium compound in an organic solvent is added to an organic solvent solution of the organoaluminum dihalide. The resultant catalyst solution is stable when the aluminum to vanadium ratio is at least 6:1 and usually no more than a trace of precipitate is noted. If desired, a solution of organoaluminum dihalide may be added to the solution of the vanadium compound, but usually the catalyst is less active than that prepared following the preferred procedure. Also, dilute solutions of the catalyst components often produce a more active catalyst than when using more concentrated solutions.

The amount of catalyst employed may vary over wide ranges. For example, the ratio of the number of gram mols of butadiene to be reacted to the number of gram atomic weights of vanadium in the catalyst may be as high as 10,000:1 or higher. Usually, ratios between about 1,000:1 and 8,000:1 and preferably between about 2,000:1 and 4,000:1 give better results.

The preferred solvent for preparing the catalyst and/or polymerizing the butadiene usually comprises an aromatic hydrocarbon, but a wide variety of organic solvents may be used if desired. Good results may be obtained in most instances when utilizing benzene, toluene, etc. as the solvent, and a combination of aromatic and aliphatic hydrocarbons may give better results. For example, the catalyst is more soluble in aromatic hydrocarbons than in aliphatic hydrocarbons, and this is also true of the polymer. By using a mixture of an aromatic hydrocarbon such as benzene in combination with an aliphatic hydrocarbon such as pentane or hexane, it is possible to render the catalyst sufficiently soluble to catalyze the reaction and yet precipitate out most of the polymer as it is formed and thus allow recovery of a large amount of the polymer by simple filtration. When mixed solvents are used, the solvent mixture may contain, for example, by volume 25–75% of the aliphatic hydrocarbon and 75–25% of the aromatic hydrocarbon.

The concentration of butadiene in the polymerization solvent may vary over wide ranges. As a general rule, the concentration of butadiene or other conjugated diolefin may be the same as is employed in prior art solution polymerization processes for preparing a polymer therefrom. Concentrations by weight which have been found to be especially desirable are about 2–25%, and in many instances about 5–10%.

The reaction mixture containing butadiene and catalyst in an organic solvent may be allowed to react under liquid phase conditions for any suitable period of time and temperature. For instance, the polymerization may be allowed to take place over a period varying from a few minutes up to, for example, 24 hours or longer, but usually a reaction time of about 15 minutes to 8 hours is preferred. Often, the reaction time may be as short as 30 minutes to 4 hours and reaction times of about 1 hour under the preferred reaction conditions may be satisfactory. The polymerization temperature likewise may vary over wide ranges, but usually temperatures below about 80–100° C. are preferred. Polymerization temperatures of about 20–55° C. often give better results, but much lower temperatures may be used in some instances such as −25° C. to 0° C. As a general rule, at low reaction temperatures longer reaction periods may be preferred, and at higher reaction temperatures shorter reaction periods.

When preparing the catalyst, the presence of diorganoaluminum halide or triorganoaluminum in proportions which do not produce an equilibrium mixture of organoaluminum dihalide results in a catalyst which is less reactive. If substantial additions are made, the catalyst may be no longer soluble in aromatic solvents. For example, if diorganoaluminum halide or triorganoaluminum is substituted for the organoaluminum dihalide in the catalyst recipe, a precipitate is formed which is ineffective as a catalyst for preparing trans-1,4-polybutadiene.

The catalyst is most active when prepared and utilized in solvents comprising an aromatic hydrocarbon. The catalyst activity tends to decrease somewhat at elevated temperature and lower polymerization temperatures are usually preferred. Polymerizations at substantially room temperatures such as 20–25° C. are very satisfactory.

The polybutadiene prepared in accordance with the invention may have a high trans-1,4-polybutadiene content, and often as high as 95–100%. Thus, the catalysts are very effective stereospecific polymerization catalysts.

Conjugated diolefins which may be used in practicing the invention have the following general formula:

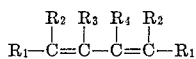

of which conjugated diolefins of the following general formula may be preferred:

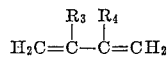

Specific examples of conjugated diolefins include 1,3-butadiene, isoprene, piperylene, 2,3-dimethylbutadiene and 1,3-hexadiene. As a general rule, the substituents $R_1$, $R_2$, $R_3$, and $R_4$ in the general formulae appearing above may be hydrogen or organic radicals which do not interfere with the homopolymerization of the resultant conjugated diolefin. Examples of organic radicals include alkyl, aryl, cycloalkyl, alkyl substituted aryl and cycloalkyl radicals having 1–20 and preferably 1–8 or, for best results, 1–4 carbon atoms. In some instances, it may be desirable to polymerize mixtures of two or more of the above conjugated diolefins, such as a mixture containing by weight 1–99% of 1,3-butadiene and 99–1% isoprene. Also, often it may be desirable to substitute a cyclic conjugated diolefin such as cyclopentadiene or cyclohexadiene for the above mentioned acyclic conjugated diolefins, all of which are embraced within the term "conjugated diolefin."

The trans-1,4-polybutadiene prepared in accordance with the invention usually is a white, tough, thermoplastic material which may be used in the manufacture of floor tile, golf ball covers, battery cases, etc.

The foregoing detailed description and the following specific examples are for purposes of illustration only and are not intended as being limiting to the spirit or scope of the appended claims.

Example I

This example illustrates preparation of the catalyst in situ and the polymerization of butadiene to produce a high trans-1,4-polybutadiene.

To a one-half gallon glass reactor which had been thoroughly purged with dry nitrogen was added at 25° C.:

1 liter of dry benzene
7.5 mM. of ethyl aluminum dichloride
1.25 mM. of vanadium triacetylacetonate
67.5 grams (1.25 mols) of pure butadiene One-half of the total catalyst was added before the butadiene was introduced, and one-half was added after the butadiene was introduced. The resultant reaction mixture formed a gelled mass within two to three minutes after the final catalyst charge was added. Stirring was continued for 18 minutes at 25° C. and the reaction terminated by addition of pure methanol. The precipitated product was washed twice with pure methanol, and then dried in a vacuum oven at 55° C.

The dried, snow white product thus obtained weighed 41.3 grams (61% conversion). Infrared examination indicated that the polymer was 100% trans-1,4-polybutadiene, with neither vinyl nor cis bands being observed.

In this and subsequent examples, "mM." refers to "millimoles."

Example II

This example illustrates the use of vanadyl acetylacetonate and ethyl aluminum dichloride as components for preparing the catalyst.

A catalyst was prepared from vanadyl acetylacetonate and ethyl aluminum dichloride by addition to 100 cc. of pure benzene at room temperature in a ratio to provide an aluminum to vanadium ratio of 8. After the catalyst had aged for about 15 minutes, 0.125 mol of pure butadiene was added. The mixture was reacted for 1 hour and 20 minutes at 50° C. The butadiene to vanadium mol ratio was 2,083:1 and the reaction was terminated by addition of pure methanol. The resultant precipitated polybutadiene was recovered and washed with additional pure methanol. Thereafter, the polymer was dried in a vacuum oven. The yield was 39% and infrared examination indicated that the polymer was 92.8% trans-1,4-polybutadiene, i.e., the polymer had about 92% trans-1,4-addition.

The above procedure was repeated with the exception of using a catalyst having an aluminum to vanadium ratio of 6 and providing a butadiene to vanadium mol ratio of 1562:1. The yield was 30%, and infrared examination indicated that the polymer was 95.4% trans-1,4-polybutadiene.

*Example III*

This example illustrates the effect of varying the gram atomic weight ratio of aluminum to vanadium in the catalyst at a constant butadiene to vanadium mol ratio of 3,000:1.

The catalyst was prepared by adding vanadium triacetylacetonate and ethyl aluminum dichloride to 100 cc. of pure benzene in quantities to provide the aluminum to vanadium ratios indicated in the table below. Thereafter, 0.125 mol of pure butadiene was charged to the catalyst, and polymerization was effected over a period of 3 hours at 55° C. The polymerization was terminated by addition of methanol, followed by washing the precipitated polymer in methanol and drying in a vacuum oven.

The following data were obtained:

Al/V: Percent yield
7.6 _____ 27
15 _____ 29
20 _____ 26
25 _____ 39
30 _____ 39
35 _____ 36

*Example IV*

This example illustrates the effect on catalyst activity of the gram atomic weight ratio of aluminum to vanadium.

The catalyst was prepared by addition of vanadium triacetylacetonate and ethyl aluminum dichloride to 100 cc. of pure benzene in quantities to provide the gram atomic weight ratios of aluminum to vanadium appearing below. After the addition was completed, the appearance of the resultant solution was noted and recorded. Thereafter, 0.25 mol of pure butadiene was charged to the catalyst mixture and polymerization effected over a 45 minute period at 50° C.

The polymerization was terminated by addition of pure methanol, and the resultant precipitate washed with pure methanol and dried in a vacuum oven. The percent yield was calculated and recorded.

The data thus obtained appear below:

| Al/V | Appearance of Catalyst | Percent Yield |
|---|---|---|
| 1.5 | Brown precipitate | 0 |
| 4.5 | Cloudy | 4 |
| 7.5 | Clear | 22 |

*Example V*

This example illustrates the effect on catalyst activity of the order of addition of materials to a polymerization mixture.

The general procedure of Example I was followed, with the exception of varying the order of addition of the solvent, catalyst components, and butadiene. The catalyst components were added in ratios providing an aluminum to vanadium ratio of 6, and the butadiene was present in an amount to provide a butadiene to vanadium ratio of 2,000:1. The polymerization was for 1 hour at 25° C., and the product was recovered as noted in Example I.

The following data were obtained:

| Order of Addition of Components | | | | Percent Yield | Percent Trans |
|---|---|---|---|---|---|
| Benzene | Butadiene | EtAlCl$_2$ | VA$_3$ | | |
| 1 | 2 | 3 | 4 | 44 | 99 |
| 1 | 2 | 4 | 3 | 42 | 99 |
| 1 | 4 | 2 | 3 | 53 | 99 |

The term "VA$_3$" appearing in the above data refers to vanadium triacetylacetonate.

What is claimed is:

1. In a process for preparing a homopolymer having a high trans-1,4-configuration which comprises homopolymerizing a conjugated diolefin selected from the group consisting of 1,3-butadiene, isoprene, piperylene, 2,3-dimethylbutadiene and 1,3-hexadiene in an organic solvent therefor in the presence of a heterogenous catalyst prepared from an organoaluminum halide and a compound of a catalyst metal selected from the group consisting of vanadium, iron and titanium, the improvement of preparing said homopolymer with at least 92% trans-1,4-addition by homopolymerizing said conjugated diolefin while dissolved in a hydrocarbon solvent in the presence of a soluble catalyst prepared by reacting in a hydrocarbon solvent catalyst forming substances consisting of an alkylaluminum dihalide and a beta-diketone complex of a catalyst metal selected from the group consisting of vanadium, iron and titanium, the alkylaluminum dihalide and the beta-diketone complex of the catalyst metal being present in quantities to provide a gram atomic weight ratio of aluminum to the catalyst metal of at least 6:1.

2. The process of claim 1 wherein the catalyst is prepared from a beta-diketone complex of vanadium and an alkylaluminum dichloride.

3. The process of claim 1 wherein the catalyst is prepared from vanadium triacetylacetonate and ethylaluminum dichloride.

4. The process of claim 1 wherein the catalyst is prepared from vanadyl acetylacetonate and ethylaluminum dichloride.

5. The process of claim 1 wherein the catalyst is prepared from a beta-diketone complex of vanadium and an alkylaluminum dichloride, and the gram atomic weight ratio of aluminum to vanadium is between 6:1 and about 35:1.

6. The process of claim 1 wherein the catalyst is prepared from an acetylacetonate of vanadium and ethylaluminum dichloride, and the gram atomic weight ratio of aluminum to vanadium is between 6:1 and about 15:1.

7. In a process for preparing polybutadiene having a high trans-1,4-configuration which comprises homopolymerizing 1,3-butadiene in an organic solvent therefor in the presence of a heterogenous catalyst prepared from an organoaluminum halide and a compound of a catalyst metal selected from the group consisting of vanadium, iron and titanium, the improvement of preparing said polybutadiene with at least 92% trans-1,4-addition by homopolymerizing 1,3-butadiene while dissolved in a hydrocarbon solvent in the presence of a soluble catalyst prepared by reacting in a hydrocarbon solvent catalyst forming substances consisting of an alkylaluminum dihalide and a beta-diketone complex of a catalyst metal selected from the group consisting of vanadium, iron and titanium, the alkylaluminum dihalide and the beta-diketone complex of the catalyst metal being present in quantities to provide a gram atomic weight ratio of aluminum to the catalyst metal of at least 6:1.

8. The process of claim 7 wherein the catalyst is prepared from a beta-diketone complex of vanadium and an alkylaluminum dichloride.

9. The process of claim 7 wherein the catalyst is prepared from vanadium triacetylacetonate and ethylaluminum dichloride.

10. The process of claim 7 wherein the catalyst is prepared from vanadyl acetylacetonate and ethylaluminum dichloride.

11. The process of claim 7 wherein the catalyst is prepared from a beta-diketone complex of vanadium and an alkylaluminum dichloride, and the gram atomic weight ratio of aluminum to vanadium is between 6:1 and about 35:1.

12. The process of claim 7 wherein the catalyst is prepared from an acetylacetonate of vanadium and ethylaluminum dichloride, and the gram atomic weight ratio of aluminum to vanadium is between 6:1 and about 15:1.

References Cited by the Examiner

UNITED STATES PATENTS

| | | | |
|---|---|---|---|
| 2,886,561 | 5/1959 | Reynolds et al. | 260—94.3 |
| 2,921,056 | 1/1960 | Stuart | 260—94.9 |
| 2,962,488 | 11/1960 | Horne | 260—94.3 |
| 3,052,660 | 9/1962 | Osgan | 260—88.2 |
| 3,153,023 | 10/1964 | Lukach | 260—88.2 |
| 3,166,517 | 1/1965 | Ro | 260—82.1 |

FOREIGN PATENTS

| | | |
|---|---|---|
| 221,121 | 3/1959 | Australia. |
| 827,365 | 2/1960 | Great Britain. |
| 588,764 | 9/1960 | Belgium. |
| 857,938 | 1/1961 | Great Britain. |

OTHER REFERENCES

Natta et al.: Jour. Poly. Sci. 51, June 1961, pages 411–427.

Bier: Angew. Chem. 73, March 21, 1961, pages 186–197.

Natta et al.: Chim. e Industr. 41, February 1959, pages 116–123.

JOSEPH L. SCHOFER, *Primary Examiner.*

MARK LIEBMAN, E. J. SMITH, *Assistant Examiners.*